United States Patent
Okamoto et al.

(10) Patent No.: US 6,504,543 B1
(45) Date of Patent: Jan. 7, 2003

(54) POLYGON DRAWING METHOD AND POLYGON DRAWING APPARATUS

(75) Inventors: Tadashi Okamoto, Osaka (JP); Satoshi Shigenaga, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/477,704

(22) Filed: Jan. 5, 2000

(30) Foreign Application Priority Data

Jan. 6, 1999 (JP) ............................................. 11-001379

(51) Int. Cl.[7] .............................................. G06T 11/20
(52) U.S. Cl. .................... 345/441; 345/467; 345/469.1; 345/470
(58) Field of Search ................................ 345/441, 442, 345/443, 467, 468, 469, 469.1, 472.1, 472.2, 472.3, 589, 590–593, 560–568, 470–472, 694–698, 26, 17; 382/162–167, 174–185

(56) References Cited

U.S. PATENT DOCUMENTS

| | | | | |
|---|---|---|---|---|
| 5,016,001 A | * | 5/1991 | Minagawa et al. | 345/442 |
| 5,029,106 A | * | 7/1991 | Kai et al. | 345/443 |
| 5,303,340 A | * | 4/1994 | Gonzalez-Lopez et al. | 345/441 |
| 5,613,052 A | * | 3/1997 | Narayanaswami et al. | 345/627 |
| 5,757,384 A | * | 5/1998 | Ikeda et al. | 345/468 |
| 5,841,447 A | * | 11/1998 | Drews | 345/563 |
| 5,912,994 A | * | 6/1999 | Norton et al. | 382/283 |
| 5,933,588 A | * | 8/1999 | Easwar et al. | 358/1.17 |
| 6,047,116 A | * | 4/2000 | Murakami et al. | 716/19 |
| 6,049,628 A | * | 4/2000 | Chen et al. | 382/283 |
| 6,057,825 A | * | 5/2000 | Takakura et al. | 345/24 |
| 6,084,599 A | * | 7/2000 | Nakatsuka et al. | 345/501 |

FOREIGN PATENT DOCUMENTS

| | | | | |
|---|---|---|---|---|
| JP | 61034677 | 2/1986 | | |
| JP | 62-83790 | 4/1987 | ............ | G09G/1/28 |
| JP | 62-192878 | 8/1987 | ............ | G09G/1/16 |
| JP | 1-296389 | 11/1989 | ............ | G06F/15/72 |
| JP | 3-116288 | 5/1991 | ............ | G06F/15/72 |
| JP | 03214368 | 9/1991 | | |
| JP | 6314091 | 11/1994 | | |
| JP | 9251293 | 9/1997 | | |
| JP | 2806185 | 7/1998 | | |

OTHER PUBLICATIONS

Japanese Official Action; Feb. 26, 2002 for Patent Application No. 2000–000906.

James D. Foley et al., "Filling Polygons" Computer Graphics, Second Edition, 1990, pp. 92–95.

James D. Foley et al., "19.5 Filling Algorithms" Computer Graphics, Second Edition, 1990, pp. 978–987.

* cited by examiner

Primary Examiner—Matthew Luu
Assistant Examiner—Thu-Thao Havan
(74) Attorney, Agent, or Firm—Wenderoth, Lind & Ponack, L.L.P.

(57) ABSTRACT

A polygon drawing apparatus for drawing a polygon which is colored inside its outline by using outline data indicating the outline of the polygon, the apparatus comprising: an outline data generation unit for generating outline data indicating the outline of the polygon on the basis of coordinate data indicating the coordinates of points constituting the polygon; a mask data generation unit for performing, for a predetermined amount of the outline data, parallel exclusive-OR processes in units of amounts constituting the predetermined amount, thereby generating mask data which specifies "coloring" for the inside of the outline; and a segment generation unit for drawing the polygon by using the mask data generated by the mask data generation means. Therefore, this polygon drawing apparatus can provide a satisfactory result of display without using a bulk memory, and without increasing the processing load.

20 Claims, 13 Drawing Sheets

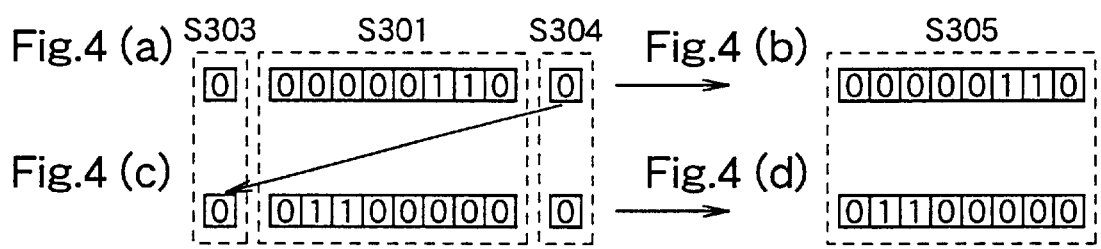
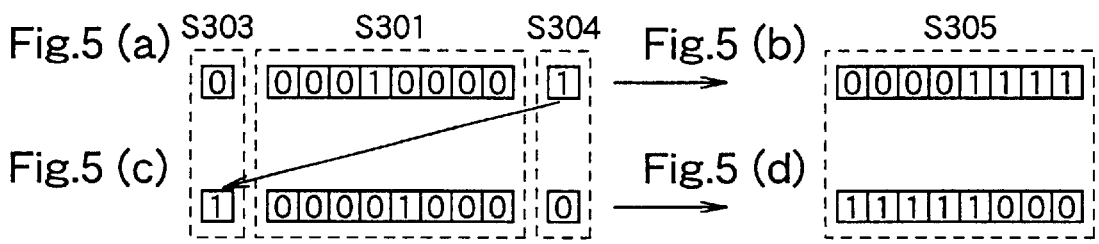

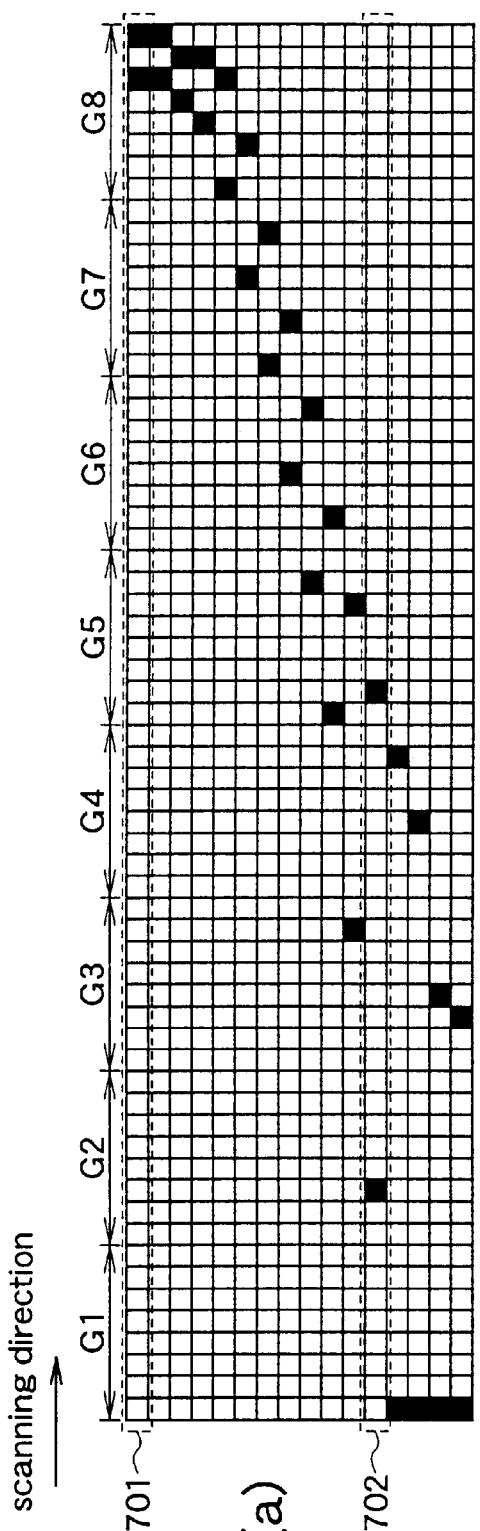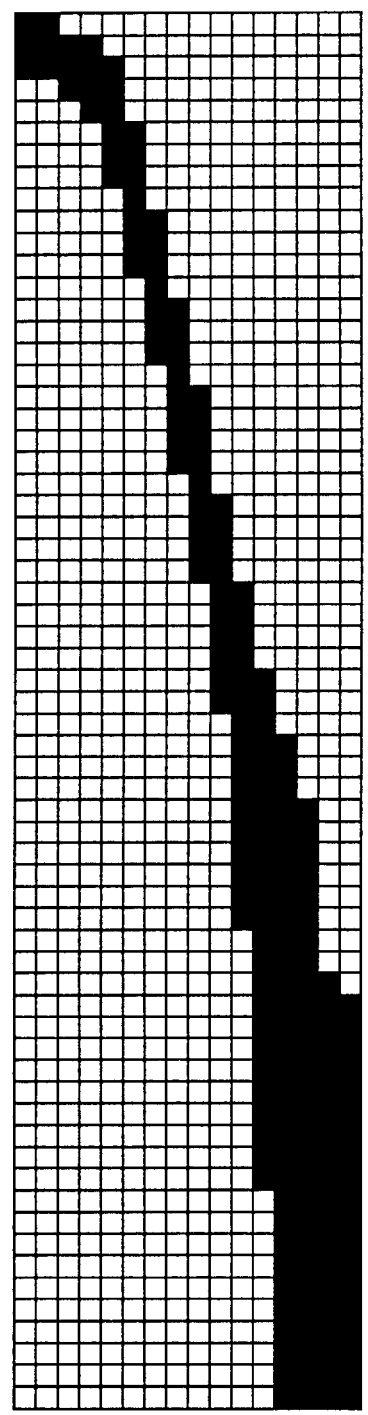
Fig.7 (a)
Fig.7 (b)

Prior Art
Fig.13 (a)
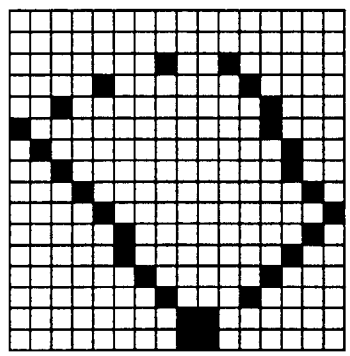
Fig.13 (b)
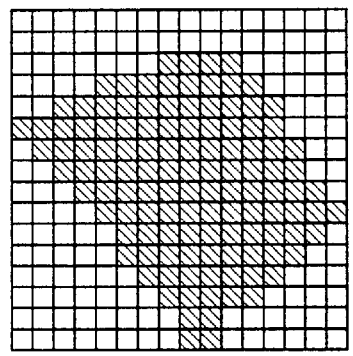
Fig.13 (c)  procedure 1
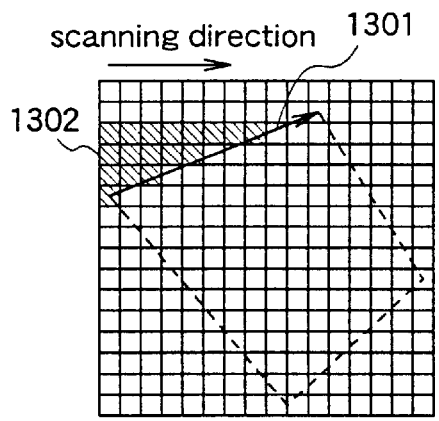
Fig.13 (d)  procedure 2
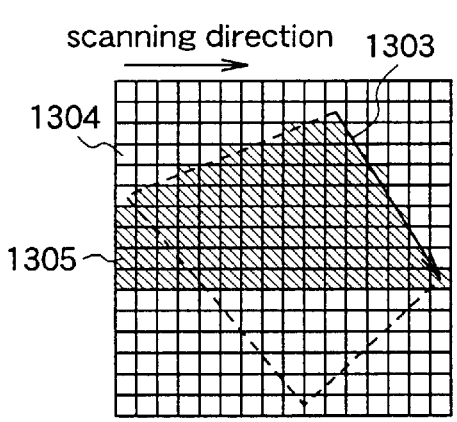
Fig.13 (e)  procedure 3
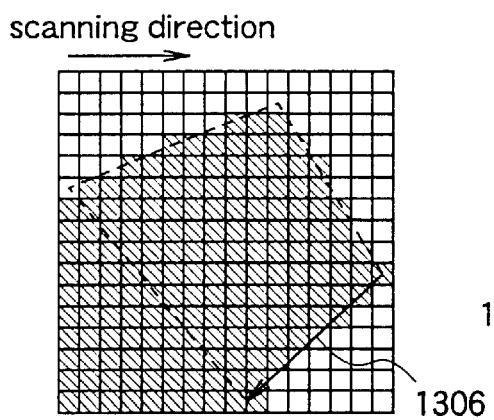
Fig.13 (f)  procedure 4
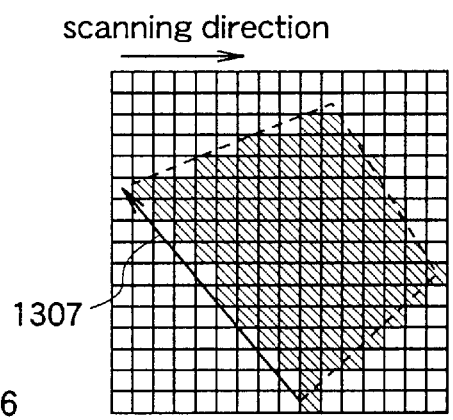

POLYGON DRAWING METHOD AND POLYGON DRAWING APPARATUS

FIELD OF THE INVENTION

The present invention relates to a polygon drawing method and a polygon drawing apparatus and, more particularly, to those for drawing a polygon which is colored inside its outline, by using data indicating the outline of the polygon.

BACKGROUND OF THE INVENTION

When outputting characters to a printer or the like, the bit map font in which each character is represented as an array of dots has the advantage of rapidly displaying the characters on a screen and, therefore, this font has generally been used in computer systems and the like. In the bit map font, however, since the number of dots constituting each character is determined, the dots increase in size as the character is scaled up, and the stepwise notches called "jaggy" become conspicuous. As a result, the outline font has spread in recent years. In the outline font, each character is treated as a polygon and represented as the outline of the polygon. The outline font comprises coordinates of representative points specifying the polygon as the formula of the character, and data indicating curves or straight lines for connecting the representative points with each other. By using the outline font, even when a large character is printed, a beautiful print having no jaggy is obtained and, moreover, a character of an arbitrary size can be printed. The outline font has spread as being mounted on printers and word processors, and recently it is increasingly used for screen display of personal computers and the like.

When processing a character or the like by using the outline font, the procedure is as follows. The coordinates of plural points (representative points) specifying a polygon constituting a character are stored as data. When printing or displaying the character, the outline of the polygon constituting the character is calculated through the representative points, and the inside of the outline is painted. Accordingly, when printing characters of different sizes, it is possible to use a font which is scaled up or down by calculation based on the fundamental font. Therefore, the outline font is advantageous over the dot font like the bitmap font in that it doesn't need to have different font data for different sizes of characters.

There are two typical methods for painting the inside of the outline, "scan conversion" and "seed painting". In the scan conversion method, with respect to the edges of a given polygon, intersections of each horizontal scanning line with the edges of the polygon are detected, and the space between the intersections is colored (refer to 3D computer graphics, written by Nakamae, published by Shoko-do, pp.117–120).

On the other hand, the seed painting method is as follows. Initially, one unit (one pixel) specified as the starting point (seed) of painting inside the outline is painted, and a pixel to be painted next is detected from pixels surrounding the seed pixel (starting point), and thereafter, the same process as above is repeated with the detected pixel as a new seed. The painting is completed when there are no more pixels to be a new seed (refer to Japanese Published Patent Applications Nos. Sho.62-83790 and Sho.62-192878).

Japanese Published Patent Applications Nos. Hei.1-296389 and Hei.3-116288 disclose improved methods based on the typical painting methods described above. In these methods, data indicating the outline of a character or the like (hereinafter referred to as outline data) is stored in a control plane, and the dots inside the outline are colored on the basis of the data.

To be specific, the method disclosed in Japanese Published Patent Application No. Hei.1-296389 is aimed at avoiding the difficulty in determining a starting point in the seed painting method, which difficulty will be described later. In this method, when storing the outline data in the control plane, a segment or a curve corresponding to the outline data is generated to be stored. Then, it is decided whether the generated segment (or curve) is positioned on the left side of the horizontal scanning line (in this case, the count value of the segment is odd) or on the right side of the scanning line (in this case, the count value of the segment is even), and control data indicating the result of this decision is generated, and painting is performed according to the control data while scanning in the horizontal direction, whereby the process of determining the starting point is dispensed with.

Further, the method disclosed in Japanese Published Patent Application No. Hei.3-116288 is aimed at reducing the processing load, as compared with the above-described painting methods. In this method, painting start data is subtracted from painting end data to obtain painting data which specifies painting. Thereby, the processing is simplified and the processing load is reduced.

Further, there is still another painting method disclosed in the specification of HD64412 by Hitachi. According to this method, painting data is generated by performing an EXOR (Exclusive OR) operation on a control plane from a reference line (left end) on the basis of outline data, and the dots inside the outline are colored on the basis of the painting data so generated, thereby simplifying the painting process.

By the way, also in the field of car navigation system which has been remarkably developed in recent years, high-quality characters can be displayed by using the outline font described above. Further, in the car navigation system, when displaying a graphic such as map information, buildings and natures (river, pond, etc.) are handled as polygons, and painting is performed on the basis of data indicating the outlines of the polygons in the same manner as described for the outline font, thereby displaying the map information according to various kinds of contraction scales. FIGS. 10(a)–10(d) are diagrams for explaining the polygon processing in the display of the car navigation system. FIG. 10(a) shows outline data for displaying a character "A", and FIG. 10(b) shows the character obtained by painting the inside of the outline data. Like the character, the graphic shown in FIG. 10(d) is obtained on the basis of outline data of the graphic shown in FIG. 10(c).

In the conventional polygon drawing method so constructed, it is not necessary to prepare a font or a graphic pattern for each character size, and a character or a graphic with smooth outline can be displayed even when it is scaled up.

However, in the above-described scan conversion method, since the processing load due to sorting of coordinate data constituting the edges is considerable, the processing time is decided not by the size of the graphic but by the number of the edges. Therefore, when processing a character constituted by many edges, the processing takes time even if the character is a relatively small graphic. Further, since curves cannot be used in the outline, it is necessary to approximate straight lines to curves. So, in order to represent a high-quality character or the like, a lot of straight lines are needed, and the number of the edges increases significantly, resulting in an increase in processing time.

On the other hand, the problem of the seed painting method resides in the difficulty in determining a seed pixel to be a starting point. That is, in the seed painting algorithm, a graphic representing one character is handled as one polygon, and this is one continuous region. So, one graphic (character or the like) can be processed with one seed pixel determined. However, if the graphic (character or the like) has a constricted part, the continuous region is sometimes divided into plural regions when the graphic is scaled down. In the seed painting method, when there are plural regions each being surrounded by an outline, plural seed pixels must be specified. So, in order to avoid that a small region separated from one region remains unpainted, plural seed pixels must be specified. Accordingly, in this case, the character cannot be processed according to the relatively simple algorithm in which one seed pixel is selected for one character, and the procedure is complicated for appropriately processing the character.

As described above, Japanese Published Patent Application No. Hei.1-296389 has proposed a method which solves the above-described problems in the seed painting method. In this method, however, since segments or the like are generated while performing the above-described decision for generating control data and then the segments or the like are stored in the control plane, the processing load increases considerably due to the generation and storage of the segments or the like.

Further, the method disclosed in Japanese Published Patent Application No. Hei.30116288 has the following problems. FIGS. 11(a)–11(d) and 12(a)–12(b) are diagrams for explaining the processes and problems in this method.

FIG. 11(a) shows outline data for displaying a character "A", and FIG. 11(b) shows the character to be obtained by painting the inside of the outline data. As described above, in this method, the outline data shown in FIG. 11(a) is scanned in the horizontal direction to generate odd data indicating the position where painting is started in the scanning line (painting start data) and even data indicating the position where the painting is ended (painting end data), and these data are arithmetically processed to obtain painting data indicating the region to be painted. In FIG. 11(a), the outline of the graphic to be drawn is shown by a line obtained by connecting adjacent ■ with each other, and in FIG. 11(b), a region to be painted is shown by an array of ■.

FIGS. 12(a) and 12(b) are diagrams for explaining the arithmetic processing in this method. FIG. 12(a) shows the processing performed on a scanning line 1101 shown in FIG. 11(c), and FIG. 12(b) shows the processing performed on a scanning line 1102 shown in FIG. 11(c). In FIG. 12(a), 1201 denotes a scanning line including 16 pixels, and this is identical to 1103 shown in FIG. 11(c). Further, 1202 denotes odd data indicating the painting start position in the scanning line 1101, 1203 denotes even data indicating the painting end position in the scanning line 1101, 1204 denotes painting data obtained by the arithmetic processing, and 1205 denotes the result of display corresponding to one horizontal scanning line, which is obtained according to the painting data 1204.

The odd data 1202 is 16-bit data, wherein only the bits corresponding to the pixels to be the painting start positions amongst the pixels included in the scanning line 1201 have the values "1" while the other bits have the value "0". The even data 1203 is 16-bit data, wherein only the bits corresponding to the pixels to be the painting end positions amongst the pixels included in the scanning line 1201 have the values "1" while the other bits have the values "0". The reason why each data is 16-bit data is because the resolution of the outline data is 16×16 (refer to FIG. 11(a)) and the number of pixels in the horizontal scanning line is 16.

As described above, according to this method, the painting data is obtained by subtracting the odd data (painting start data) from the even data (painting end data). As shown in FIG. 12(a), when processing the scanning line 1201, the painting data 1204 is obtained by subtracting the odd data 1202 from the even data 1203. The result of display for one horizontal scanning line obtained by painting the pixels corresponding to the bits of "1" in the painting data 1204, is shown by 1205. When 1205 is compared with 1201, the pixel at the left end of the region to be painted remains unpainted, i.e., a defect occurs, and the width of the font is narrowed at this portion.

FIG. 12(b) shows a similar process to the process shown in FIG. 12(a). Odd data 1207 and even data 1208 are obtained from a scanning line 1206 (identical to 1104 shown in FIG. 11(c)), and painting data 1209 is obtained by subtracting the odd data from the even data. The result of display corresponding to the painting data 1209 is shown by 1210. Also, in this case, when 1210 is compared with 1206, the pixel at the left end of the region to be painted remains unpainted, i.e., a defect occurs, and the width of the font is narrowed at this portion.

According to the above-described method, since the painting data is obtained by such simple subtraction, the processing load can be reduced. However, defects may occur in the data to be colored. That is, as shown in FIG. 11(d), the character "A" displayed according to the painting process of this method is thinner than the character "A" to be displayed originally (FIG. 11(b)). The countermeasure against this problem is to correct the painting data such that the outline including the unpainted portion is re-drawn, by using the outline data shown in FIG. 11(a). However, this re-drawing of the outline performed after generation of the painting data reduces the expected effect of reducing the processing load.

Meanwhile, the method disclosed in the specification of HD64412 aimed at reducing the processing load has the following problems. FIGS. 13(a)–13(f) are diagrams for explaining the processes and problems in this method. FIG. 13(a) shows outline data stored in a control plane, which is used in this method. FIG. 13(b) shows the result of display to be obtained according to the outline data shown in FIG. 13(a). Further, FIGS. 13(c)–13(f) are diagrams for explaining the procedures of this method.

In FIG. 13(c), 1301 denotes segment data which is a portion of the outline data shown in FIG. 13(a). In this method, left-to-right scanning is performed in the horizontal direction, and the inside of the outline is painted from the left in accordance with the segment data (outline data). In this process, with respect to a unit (pixels) for which "painting" has been done in the previous stage, "painting" is eliminated in the subsequent (present) stage. This is implemented by executing an EXOR operation.

To be specific, in procedure 1 shown in FIG. 13(c), painting based on the segment data 1301 is performed. Procedure 1 is started in the initial state where "painting" has not been performed. So, in procedure 1, a region 1302 (slashed region) is painted on the basis of the segment data 1301.

Procedure 1 is followed by procedure 2 shown in FIG. 13(d). Procedure 2 is performed on segment data 1303 included in the outline data shown in FIG. 13(a). Since procedure 2 is performed on the state obtained as the result of procedure 1, "painting" is eliminated by an EXOR operation from the region 1302 which has been painted as shown in FIG. 13(c). Accordingly, a region 1304 in FIG. 13(d) corresponding to the region 1302 in FIG. 13(c) is in the state where "painting" is not performed. Further, by executing the procedure 2, a region 1305 (slashed region) is painted according to segment data 1303. Likewise, in the following procedure 3 shown in FIG. 13(e), painting is performed according to segment data 1306, and in procedure 4 shown in FIG. 13(f), painting is performed according to segment data 1307, whereby the display result is obtained.

In this way, since painting is performed while executing the simple EXOR operation, the processing load is reduced. However, in the course of the above-described procedures, painting and the EXOR operation are repeatedly performed on the left-end portion of the graphic, i.e., this portion is once subjected to "painting" and the subjected to elimination of "painting". Therefore, as seen from FIG. 13(f) in comparison with FIG. 13(b), a region to be painted remains unpainted. Although this problem can be solved by correcting the painting data with the outline data shown in FIG. 13(a) such that the whole outline including the unpainted portion is re-drawn, the re-drawing of the whole outline reduces the expected effect of reducing the processing load.

Further, the above-described painting process using outline data is restricted by the capacity of a storage unit. FIGS. 14(a) and 14(b) are diagrams for explaining this problem. FIG. 14(a) shows data indicating the outline of a river to be displayed in map information of a car navigation system, and FIG. 14(b) shows the displayed graphic of the river. The aforementioned process using outline data is based on the premise that it employs a storage unit having a capacity sufficient to store the outline data. Especially when handling plural polygons having different sizes as those displayed in the map information or the like, a storage unit having a sufficient capacity is needed, and this leads to an increase in device cost.

Further, the graphic (river) shown in FIG. 14(b) extends over a wide area, but the ratio of the region to be colored to the area is small, and moreover, the region to be colored is continuous. When such graphic (river) is processed by the conventional technique, since the conventional technique is for processing a region to be colored and a region to be uncolored equally and so it has not been used for processing a relatively wide and continuous region at one time, the processing efficiency is not high as a whole.

As described above, when displaying a polygon by using outline data indicating the outline of the polygon, it is difficult to realize both a reduction in processing load and a satisfactory display without defects of data. Further, since the processing is restricted by the capacity of the storage unit, the device cost increases to display various kinds of objects (polygons).

SUMMARY OF THE INVENTION

The present invention is made to solve the above-described problems and it is an object of the present invention to provide a polygon drawing method which can provide a satisfactory result of display without increasing the processing load.

It is another object of the present invention to provide a polygon drawing method which can display various kinds of objects by efficient processing without using a mass storage unit.

It is still another object of the present invention to provide a polygon drawing apparatus which can provide a satisfactory result of display without increasing the processing load.

It is a further object of the present invention to provide a polygon drawing apparatus which can display various kinds of objects by efficient processing without using a mass storage unit.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a polygon drawing method for drawing a polygon which is colored inside its outline, by using outline data indicating the outline of the polygon. This method comprises the steps of: performing, for a predetermined amount of the outline data, parallel exclusive-OR processes in units of amounts constituting the predetermined amount, thereby generating mask data which specifies "coloring" for the inside of the outline; and drawing the polygon by using the generated mask data. Therefore, the processing load can be reduced by executing the relatively simple processes in parallel.

According to a second aspect of the present invention, in the polygon drawing method of the first aspect, the step of generating the mask data includes, besides the exclusive-OR processes, OR processes to obtain the OR of the predetermined amount of the outline data and each of the results of the parallel exclusive-OR processes performed on the predetermined amount of the outline data. Therefore, the processing load can be reduced by executing the relatively simple processes in parallel. Further, since the outline data can be immediately corrected in the process of generating the outline data, no defect of data occurs, resulting in satisfactory display. Moreover, an additional process for correcting the outline data can be dispensed with.

According to a third aspect of the present invention, there is provided a polygon drawing method for drawing a polygon which is colored inside its outline, by using outline data indicating the outline of the polygon. This method comprises the steps of: generating mask data specifying "coloring" for the inside of the outline by using a predetermined amount of the outline data, and generating status data indicating whether or not the mask data generating status should be continued exceeding the predetermined amount of the outline data; drawing the polygon by using the generated mask data; and performing subsequent generation of mask data and status data, by using the status data obtained in the previous generation of mask data and status data, as well as the predetermined amount of the outline data. Therefore, the outline data can be divided into predetermined amounts to be processed efficiently and appropriately.

According to a fourth aspect of the present invention, in the polygon drawing method of the third aspect, the mask data is obtained by correcting mask data which has been generated by using the predetermined amount of the outline data indicating the outline, in accordance with the predetermined amount of the outline data. Therefore, the outline data can be divided into predetermined amounts to be processed efficiently and appropriately. Further, since the outline data can be immediately corrected in the process of generating the outline data, no defect of data occurs, resulting in satisfactory display. Moreover, an additional process for correcting the outline data can be dispensed with.

According to a fifth aspect of the present invention, there is provided a polygon drawing apparatus for drawing a polygon which is colored inside its outline, by using outline data indicating the outline of the polygon. This apparatus comprises outline data generation means for generating outline data indicating the outline of the polygon, on the basis of coordinate data indicating the coordinates of points constituting the polygon; mask data generation means for performing, for a predetermined amount of the outline data, parallel exclusive-OR processes in units of amounts constituting the predetermined amount, thereby generating mask data which specifies "coloring" for the inside of the outline; and segment generation means for drawing the polygon by using the mask data generated by the mask data generation means. Therefore, the processing load can be reduced by executing the relatively simple processes.

According to a sixth aspect of the present invention, in the polygon drawing apparatus of the fifth aspect, the mask data generation means performs, besides the exclusive OR processes, OR processes to obtain the OR of the predetermined amount of the outline data and each of the results of the parallel exclusive-OR processes performed on the predetermined amount of the outline data. Therefore, the processing load can be reduced by executing the relatively simple processes in parallel. Further, since the outline data can be immediately corrected in the process of generating the outline data, no defect of data occurs, resulting in satisfactory display. Moreover, an additional process for correcting the outline data can be dispensed with.

According to a seventh aspect of the present invention, there is provided a polygon drawing apparatus for drawing a polygon which is colored inside its outline, by using outline data indicating the outline of the polygon. This apparatus comprises: outline data generation means for generating outline data indicating the outline of the polygon, on the basis of coordinate data indicating the coordinates of points constituting the polygon; mask data generation means for generating mask data specifying "coloring" by using a predetermined amount of the outline data indicating the outline, and generating status data indicating whether or not the mask data generating status should be continued exceeding the predetermined amount of the outline data and, when the status data indicates "continuation", continuing the mask data generation and the status data generation by using the predetermined amount of outline data generated in the next stage by the outline data generation means, and the status data indicating the previous processing status; and segment drawing means for drawing the polygon by using the mask data generated by mask data generation means. Therefore, the outline data can be divided into predetermined amounts to be processed efficiently and appropriately.

According to an eighth aspect of the present invention, in the polygon drawing apparatus of the seventh aspect, the mask data is obtained by correcting mask data which has been generated by the mask data generation means using the predetermined amount of the outline data indicating the outline, in accordance with the predetermined amount of the outline data. Therefore, the outline data can be divided into predetermined amounts to be processed efficiently and appropriately. Further, since the outline data can be immediately corrected in the process of generating the outline data, no defect of data occurs, resulting in satisfactory display. Moreover, an additional process for correcting the outline data can be dispensed with.

According to a ninth aspect of the present invention, the polygon drawing apparatus of the fifth or seventh aspect further comprises: storage means for temporarily storing the mask data generated by the mask data generation means; and the segment generation means performing drawing by using the mask data temporarily stored by the storage means. Therefore, the outline data can be divided into predetermined amounts to be processed efficiently and appropriately. Further, generation of mask data and drawing using the mask data can be executed in parallel, resulting in an increase in processing speed.

BRIEF DESCRIPTION OF THE DRAWINGS

FIGS. 4(a)–4(d) are diagrams for explaining generation of mask data in the polygon drawing apparatus of the first embodiment.

FIGS. 5(a)–5(d) are diagrams for explaining generation of mask data in the polygon drawing apparatus of the first embodiment.

FIGS. 7(a) and 7(b) are diagrams for explaining the storage state of outline data according to the second embodiment, and the process using the outline data.

FIGS. 13(a)–13(f) are diagrams for explaining the painting procedures by using outline data, in the polygon drawing method according to the prior art.

DETAILED DESCRIPTION OF THE PREFERRED EMBODIMENTS

Embodiment 1

A polygon drawing apparatus according to a first embodiment of the present invention performs exclusive-OR (EXOR) processes in parallel to realize efficient drawing.

Figure 1:
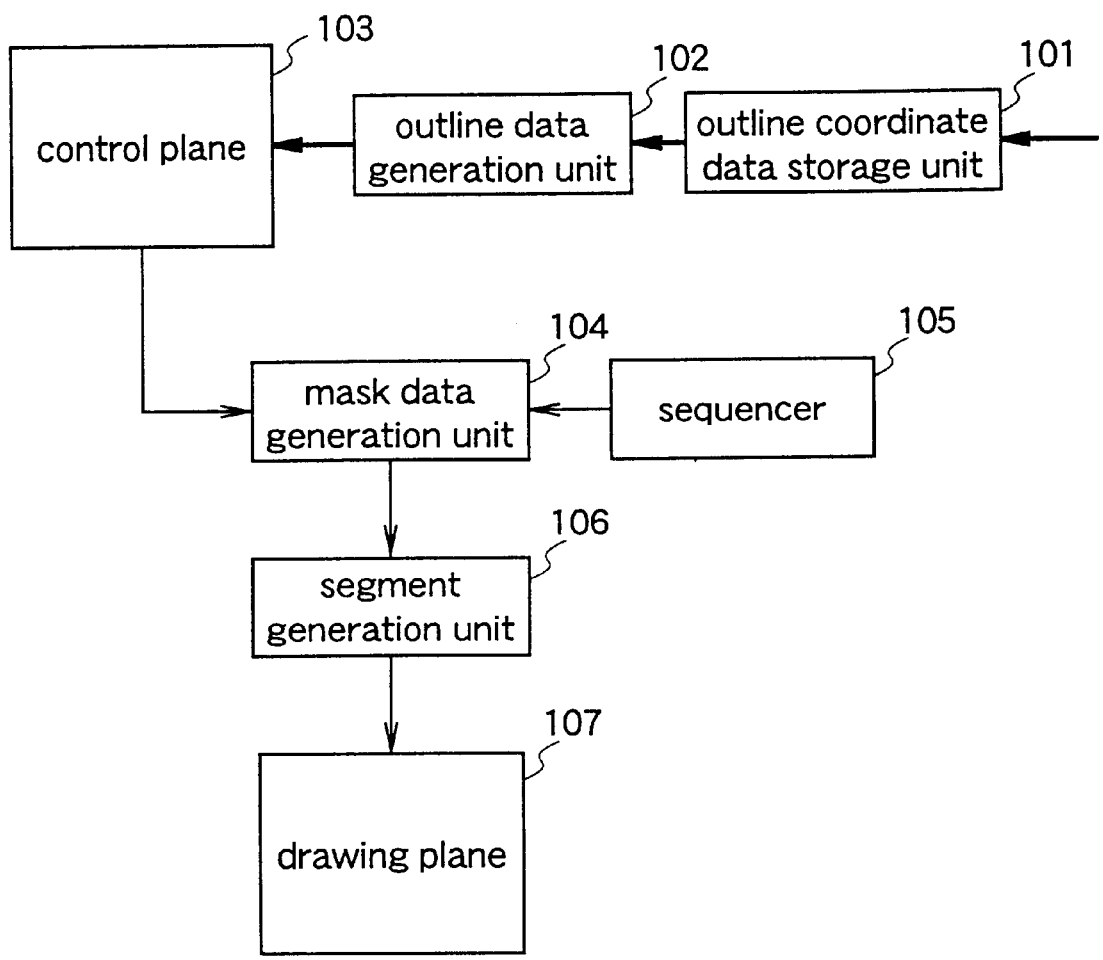
FIG. 1 is a block diagram illustrating the structure of a polygon drawing apparatus according to a first embodiment of the present invention.

FIG. 1 is a block diagram illustrating the structure of a polygon drawing apparatus according to the first embodiment. The polygon drawing apparatus comprises an outline coordinate data storage unit 101, an outline data generation unit 102, a control plane 103, a mask data generation unit 104, a sequencer 105, a segment generation unit 106, and a drawing plane 107.

The outline coordinate data storage unit 101 stores outline coordinate data indicating the coordinates of plural points, which is input to the polygon drawing apparatus of this first embodiment. The outline data generation unit 102 generates outline data indicating the outline of a polygon to be displayed, on the basis of the outline coordinate data stored in the outline coordinate data storage unit 101, and this unit 102 corresponds to an outline data generation means which generates outline data indicating the outline of a polygon, on the basis of coordinate data indicating the coordinates of points constituting the polygon. The control plane 103 stores the outline data generated by the outline data generation unit 102. The mask data generation unit 104 reads the outline data stored in the control plane 103 by a predetermined amount at a time, and processes the data, thereby generating mask data indicating "coloring". This unit 104 corresponds to a mask data generation means described later. The sequencer 105 controls the process performed by the mask data generation unit 104. The segment generation unit 106 writes the data which has been subjected to coloring, in the drawing plane 107, on the basis of the mask data generated by the mask data generation unit 104. This unit 106 corresponds to a segment generation means which performs drawing of the polygon by using the mask data generated by the mask data generation unit 104. The drawing plane 107 stores the data to be displayed. The data stored in the drawing plane 107 is output from the polygon drawing apparatus to be displayed or printed.

Hereinafter, the operation of the polygon drawing apparatus so constructed will be described with reference to drawings.

Figure 2:
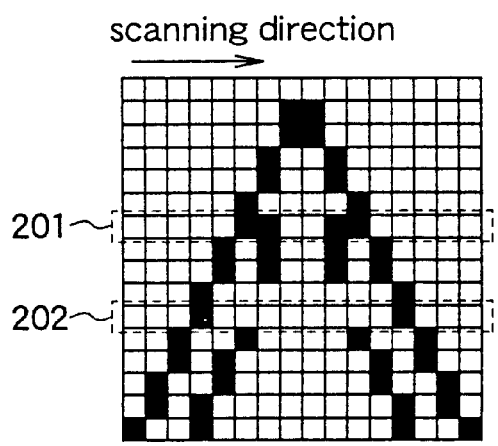
FIGS. 2(a)–2(d) are diagrams for explaining the storage state of outline data according to the first embodiment, and the process using the outline data.
Figure 2:
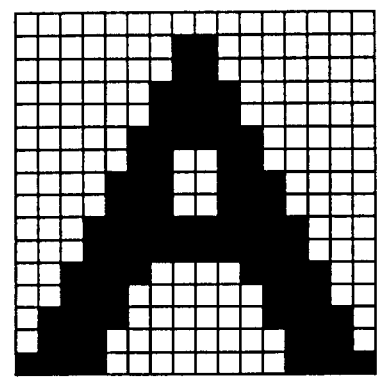
Figure 2:
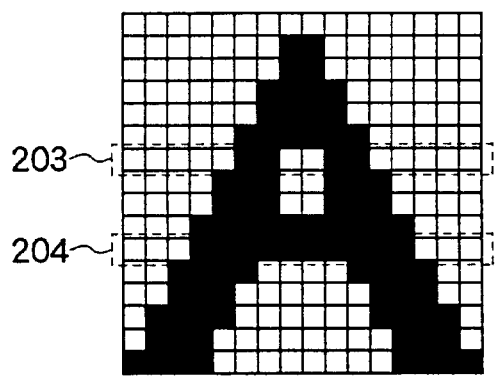
Figure 2:
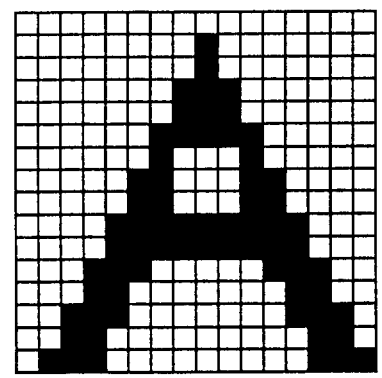

When outline coordinate data indicating the coordinates of points constituting a polygon is input to the polygon drawing apparatus of this first embodiment, the outline coordinate data is stored in the outline coordinate data storage unit 101. Thereafter, the outline data generation unit 102 generates outline data indicating the outline of the polygon to be displayed, on the basis of the outline coordinate data, and stores this in the control plane 102. FIG. 2(*a*) shows the state of the outline data stored in the control plane 103, and this outline data corresponds to a polygon "A" shown in FIG. 2(*b*). That is, FIG. 2(*b*) shows a graphic to be displayed according to the outline data shown in FIG. 2(*a*).

The mask data generation unit 104 reads the outline data stored in the control plane 103 by a predetermined amount at a time, and processes the data under control of the sequencer 105, thereby generating mask data in which the inside of the outline data is painted.

Figure 3:
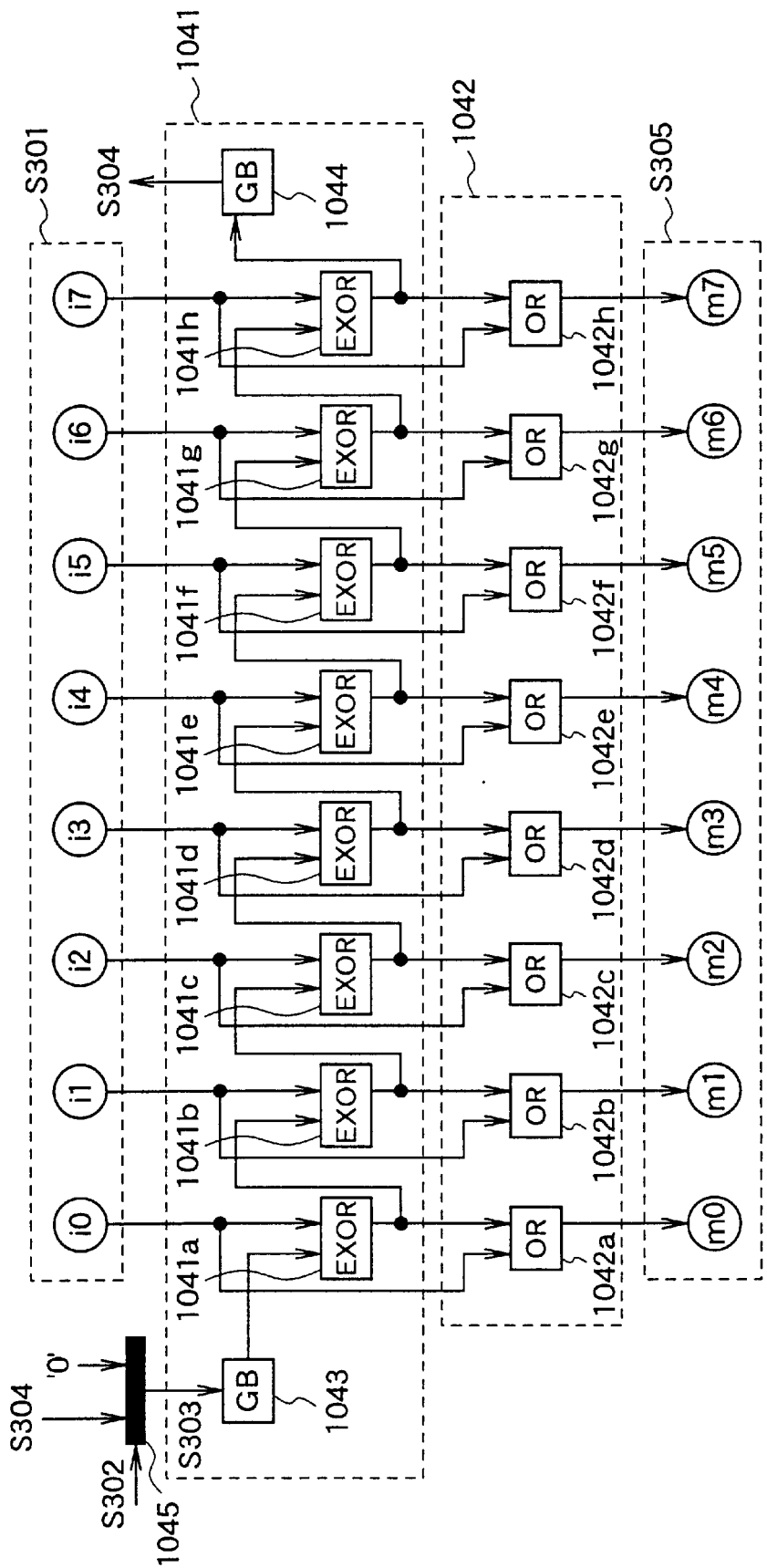
FIG. 3 is a diagram for explaining the internal structure of a mask data generation unit included in the polygon drawing apparatus of the first embodiment, and the operation thereof.

FIG. 3 is a diagram for explaining the internal structure and operation of the mask data generation unit 104. In FIG. 3, the mask data generation unit 104 includes a guard bit generator 1041, a mask processor 1042, and a selector 1045. When outline data S301 from the control plane 103 shown in FIG. 1 is input to the mask data generation unit 104, all of the bits in a section from a bit position where the first "1" appears in the outline data S301 to a bit position where the next "1" appears in the outline data S301 are set to "1", thereby generating mask data indicating that this section is to be painted. The mask data so generated is output to the segment generation unit 106. The mask data generation unit 104 of this first embodiment receives a predetermined amount (8 bits) of outline data S301, and processes the data to generate 8-bit mask data S305.

The guard bit generator 1041 generates a guard bit indicating that generation of mask data should be continued, when generation of mask data extends over plural pieces of outline data S301. To be specific, in the case where, even though "1" appears in certain outline data S301, even-ordinal-numbered "1" corresponding to this does not exist in this outline data S301 but appears first in outline data S301 which is input later, the guard bit generator 1041 generates a guard bit indicating that mask data is being generated, during processing the previous outline data S301. That is, the guard bit generator 1041 processes the result of the process performed on the previously input outline data S301 (process in the previous stage) and the outline data S301 which is input this time (process in this stage), thereby generating a guard bit (1-bit data) indicating the result of the process in this stage. As shown in FIG. 3, the guard bit generator 1041 includes a previous-stage guard bit holder 1043 for holding the guard bit generated in the previous-stage process, EXOR (Exclusive OR) circuits 1041*a*–1041*h* as many as the bit number of the outline data S301, and a generated guard bit holder 1044.

The selector 1045 selects either "0" or the value of the guard bit S304 held by the generated guard bit holder 1044, according to a control signal S302 from the sequencer 105, and outputs the selected data S303 to the previous-stage guard bit holder 1043.

The guard bit generator 1041 corresponds to a mask data generation means which subjects a predetermined amount of outline data generated by the outline data generation unit 102 to parallel EXOR processes for unit amounts constituting the predetermined amount of outline data, thereby generating mask data which specifies "coloring" for the inside of the outline. The guard bit generator 1041 also corresponds to a mask data generation means which generates mask data indicating "coloring" by using the predetermined amount of outline data generated by the outline data generation unit 102, and generates state data indicating whether or not the mask data generating state should be continued exceeding the predetermined amount of outline data. When the state data indicates "continuation", the mask data generation means continues generation of mask data and generation of state data by using the predetermined amount of outline data generated by the outline data generation means and the state data indicating the previous processing state. In the guard bit generator 1041, a plurality of EXOR circuits are connected. In this first embodiment, as shown in FIG. 3, the guard bit generator 1041 includes eight EXOR circuits 1041*a*–1041*h*, and 8-bit data i0–i7 supplied from the control plane 103 and the guard bit held by the previous-stage guard bit holder 1043 are subjected to EXOR operation by two bits at a time, and the result of the EXOR operation is output to the mask processor 1042 and the generated guard bit holder 1044. More specifically, the EXOR circuit 1041*a* receives the guard bit held by the previous-stage guard bit holder 1043 and the 0th bit i0 of the outline data S301, and generates the EXOR of these bits. The EXOR circuit 1041*b* receives the output from the EXOR circuit 1041*a* and the first bit i1 of the outline data S301, and generates the EXOR of these bits. Likewise, the EXOR circuits 1041*c*–1041*h* receive the outputs from the previous EXOR circuits 1041*b*–1041*g* and the second to seventh bits i2–i7, respectively, and generate the EXOR of these bits. The output from the EXOR circuit 1041*h* is held by the generated guard bit holder 1044.

The mask processor 1042 corrects the mask data generated by the guard bit generator 1041 by using a predetermined amount (8 bits) of outline data S301 indicating the outline of the polygon. That is, this processor 1042 performs an OR operation on the predetermined amount of outline data and the results of parallel EXOR processes performed on the predetermined amount of outline data. The mask processor 1042 corresponds to a part of a mask data processing means, and includes a plurality of OR circuits. In this first embodiment, the mask processor 1042 includes eight OR circuits 1042*a*–1042*h* as shown in FIG. 3, and generates 8-bit mask data. That is, this processor performs an OR operation on the processing result output from the guard bit generator 1041 by two bits at a time, thereby generating mask data S305. To be specific, the OR circuit 1042*a* receives the 0th bit i0 of the outline data S301 and the output from the EXOR circuit 1041*a* and generates the 0th bit m0 of the mask data S305 which is the OR of these two inputs. Likewise, the OR circuits 1042*b*–1042*h* receive the outputs from the EXOR circuits 1041*b*–1041*h* and the 1st to 7th bits i1–i7 of the outline S301, and generates the 1st to 7th bits m1–m7 of the mask data S305 which or OR's of them.

That is, the mask data generation unit 104 of this first embodiment processes the outline data by 8 bits at a time. When generation of mask data should be continued exceeding 8 bits, the unit 104 generates a guard bit (state data of 1 bit) indicating the state of the previous 8-bit process and holds this for appropriately executing the subsequent 8-bit process. Further, the unit 104 generates the OR of the output during the guard bit generation process and the outline data, thereby generating mask data and, simultaneously, correcting defects included in the mask data.

Hereinafter, a description will be given of the operation of the mask data generation unit 104 when processing the outline data shown in FIG. 2(*a*). As described above, the mask data generation unit 104 of this first embodiment (refer to FIG. 1) processes the outline data by 8 bits at a time and, therefore, it reads 8 bits of outline data from the control plane 103 (refer to FIG. 1). The mask data generation unit 104 reads the horizontal lines constituting the outline data shown in FIG. 2(*a*), 8 bits by 8 bits, starting from the uppermost line, in the scanning direction shown in the figure. Since one horizontal line is composed of 16 bits, each of the horizontal lines constituting the control plane containing the outline data is divided into two parts when being read and processed by the mask data generation unit 104.

FIGS. 4(*a*)–4(*d*) and 5(*a*)–5(*d*) are diagrams for explaining the process performed by the mask data generation unit 104. Hereinafter, the 8-bits by 8-bits process performed by the mask data generation unit 104 will be described by using FIGS. 4(*a*)–4(*d*) and 5(*a*)–5(*d*), with reference to FIGS. 2(*a*)–2(*d*) and 3. FIG. 4(*a*) shows the process for the initial 8 bits from the left end of the horizontal line 201 shown in FIG. 2(*a*). In this first embodiment, when the process in the mask data generation unit 104 is started from the initial bit at the left end of the horizontal line, the selector 1045 selects the value "0" according to the control signal S302 (refer to FIG. 3) which is output from the sequencer 105 (refer to FIG. 1), and outputs this as a signal S303. In this case, the value "0" is held by the previous-stage guard bit holder 1043.

Accordingly, in the guard bit generator 1041 (refer to FIG. 3), from the guard bit (S303) having the value "0" and the 8 bits i0–i7 (S301) having the values "0", "0", "0", "0", "0", "1", "1", "0", the EXOR of the guard bit and the 0th bit i0 is obtained and, further, the EXOR of this result and the 1st bit i1 is obtained. Thereafter, the EXORs are successively obtained in like manner as described above, whereby a guard bit as the final processing result becomes "0", and this guard bit is held by the generated guard bit holder 1044. Further, the result of the EXOR operation becomes "0", "0", "0", "0", "0", "1", "0", "0", and this leads to a reduction of the font width by one pixel. However, by performing the OR operation of this EXOR result and the original outline data S301 by the mask processor 1042 (refer to FIG. 3), corrected 8-bit mask data S305 (refer to FIG. 3) is generated immediately. In this case, the mask data S305 becomes "0", "0", "0", "0", "0", "1", "1", "0" as shown in FIG. 4(*b*), and this shows the width of the font which should be obtained.

Next, a description will be given of the case where the next 8 bits in the horizontal line 201 in FIG. 2(*a*) are processed, with reference to FIG. 4(*c*). In this first embodiment, when the process in the mask data generation unit 104 is not started from the initial bit at the left end of the line, the selector 1045 selects the signal (guard bit) S304 held in the generated guard bit holder 1044, according to the control signal S302 (refer to FIG. 3) output from the sequencer 105 (refer to FIG. 1), and outputs this as a signal S303. In this case, the value "0" which has previously been held in the generated guard bit holder 1044 is input to the previous guard bit holder 1043 to be held in the holder 1043.

Then, in the guard bit generator 1041 (refer to FIG. 3), from the guard bit having the value "0" (S303) and the 8 bits i0–i7 having the values "0", "1", "1", "0", "0", "0", "0", "0", the EXOR of the guard bit and the 0th bit i0 is obtained and, further, the EXOR of the obtained EXOR and the 1st bit i1 is obtained. Thereafter, in like manner as described above, the EXORs are successively obtained, whereby a guard bit obtained as the final processing result becomes "0" and this is held by the generated guard bit holder 1044. Further, the EXOR result becomes "0", "1", "0", "0", "0", "0", "0", "0", and this leads to a reduction of the font width by one pixel. However, by performing an OR operation on the EXOR result and the original outline data S301 by the mask processor 1042 (refer to FIG. 3), corrected 8-bit mask data S305 (refer to FIG. 3) is generated immediately. In this case, the mask data S305 is "0", "1", "1", "0", "0", "0", "0", "0" as shown in FIG. 4(*d*), and this shows the width of the font which should be obtained.

Then, a horizontal line 203 shown in FIG. 2(*c*) is obtained as the result of processing in accordance with the mask data shown in FIGS. 4(*b*) and 4(*d*) on the premise that the value "0" means "no painting" while the value "1" means "painting". The painting process is performed by the segment generation unit 106 (refer to FIG. 1) and this process will be described later.

Next, a horizontal line 202 of the outline data shown in FIG. 2(*a*) is processed 8 bits by 8 bits, like the horizontal line 201. The initial 8 bits from the left end of the horizontal line 202 shown in FIG. 2(*a*) are processed as shown in FIG. 5(*a*). Also in this case, since the process is started from the initial bit at the left end of the line, the selector 1045 outputs the value "0" as a signal S303 in accordance with the control signal S302 (refer to FIG. 3) output from the sequencer 105 (refer to FIG. 1), and the value "0" is held in the previous guard bit holder 1043.

In the guard bit generator 1041 (refer to FIG. 3), from the guard bit having the value "0" (S303) and the 8 bits i0–i7 (S301) shown in FIG. 5(*a*), the EXOR of the guard bit and the 0th bit i0 is obtained, and then the EXOR of the obtained EXOR and the 1st bit i1 is obtained. Thereafter, in like manner as described above, the EXORs are successively obtained, whereby a guard bit as the final processing result becomes "1" and this is held in the generated guard bit holder 1044. Further, the EXOR result becomes "0", "0", "0", "0", "1", "1", "1", "1", and this shows the width of the font which ought to be obtained. Even when this result is ORed with the original outline data S301 by the mask processor 1042 (refer to FIG. 3), the generated 8-bit mask data S305 (refer to FIG. 3) becomes "0", "0", "0", "0", "1", "1", "1", "1" as shown in FIG. 5(b), and the previously obtained processing result is not adversely affected by the EXOR result's passing through the mask processor 1042.

Next, FIG. 5(c) shows the case where the subsequent 8 bits in the horizontal line 202 shown in FIG. 2(a) are processed. Since the process in the mask data generation unit 104 is not started from the initial bit at the left end of the line, the selector 1045 selects the signal (guard bit) S304 held by the generated guard bit holder 1044, according to the control signal S302 (refer to FIG. 3) output from the sequencer 105 (refer to FIG. 1), and outputs this as a signal S303. Accordingly, in this case, the value "1" is held in the previous guard bit holder 1043.

Then, in the guard bit generator 1041 (refer to FIG. 3), from the guard bit (S303) having the value "1" and the 8 bits i0–i7 (S301) having the values shown in FIG. 5(c), the EXOR of the guard bit and the 0th guard bit i0 is obtained, and then the EXOR of the obtained EXOR and the 1st bit i1 is obtained. Thereafter, in like manner as mentioned above, the EXORs are successively obtained, whereby a guard bit as the final processing result becomes "0" and this is held in the generated guard bit holder 1044. Further, the EXOR result becomes "1", "1", "1", "1", "0", "0", "0", "0", and thereby the width of the font is reduced by one pixel. However, by performing an OR operation on the EXOR result and the original outline data S301 by the mask processor 1042 (refer to FIG. 3), corrected 8-bit mask data S305 (refer to FIG. 3) is generated immediately. In this case, the mask data S305 becomes "1", "1", "1", "1", "1", "0", "0", "0" as shown in FIG. 5(d), and this shows the width of the font which should be obtained, as shown in FIG. 2(b). as the result of processing in accordance with the mask data shown in FIGS. 5(b) and 5(d) on the premise that the value "0" means "not painting" and the value "1" means "painting". In this way, when processing the outline data (16 bits in one horizontal line) by 8 bits at a time, the mask data generation unit 104 of this first embodiment generates 1-bit mask data and holds it, whereby the previous processing result can be used in the subsequent stage.

In FIG. 1, the mask data is output to the segment generation unit 106, and the segment generation unit 106 writes the data in a position corresponding to the mask data, in the drawing plane 107. At this time, the segment generation unit 106 performs color conversion to generate, for example, coloring data having a width of 8 bits on the basis of the 1-bit data in the mask data, and writes the coloring data in the drawing plane 107.

The data written in the drawing plane 107 is output from the polygon drawing apparatus of this first embodiment to be displayed or printed. The result of display or printing obtained from the outline data shown in FIG. 2(a) is shown in FIG. 2(c), and this is identical to the result shown in FIG. 2(d) which ought to be obtained. Accordingly, in contrast with the result of display according to the conventional method (FIG. 2(d)), there are no defects in the region to be colored, resulting in satisfactory display or printing.

As described above, the polygon drawing apparatus according to the first embodiment is provided with the mask data generation unit 104 which generates mask data under control of the sequencer 105. To be specific, the mask data generation unit 104 processes the outline data by a predetermined amount (predetermined bit width) at a time, stores the processing result as a guard bit (1 bit), and performs a relatively simple process comprising only an EXOR operation and an OR operation on the predetermined amount of data to generate mask data indicating "coloring". Therefore, it is possible to perform painting for an arbitrary bit width by repeatedly using the same apparatus. Further, simultaneously with the EXOR operation for painting, the result of the EXOR operation is subjected to the OR operation for correcting the defects in the original font. Therefore, defects in the mask data due to the EXOR operation are immediately corrected simultaneously with the generation of the mask data, resulting in painting with no defects. Further, since the respective EXOR processes are performed in parallel, both a high-speed processing and a satisfactory display are realized.

Embodiment 2

A polygon drawing apparatus according to a second embodiment of the present invention performs similar processing to that described for the first embodiment, and includes a mask buffer in addition to the constituents of the apparatus of the first embodiment.

Figure 6:
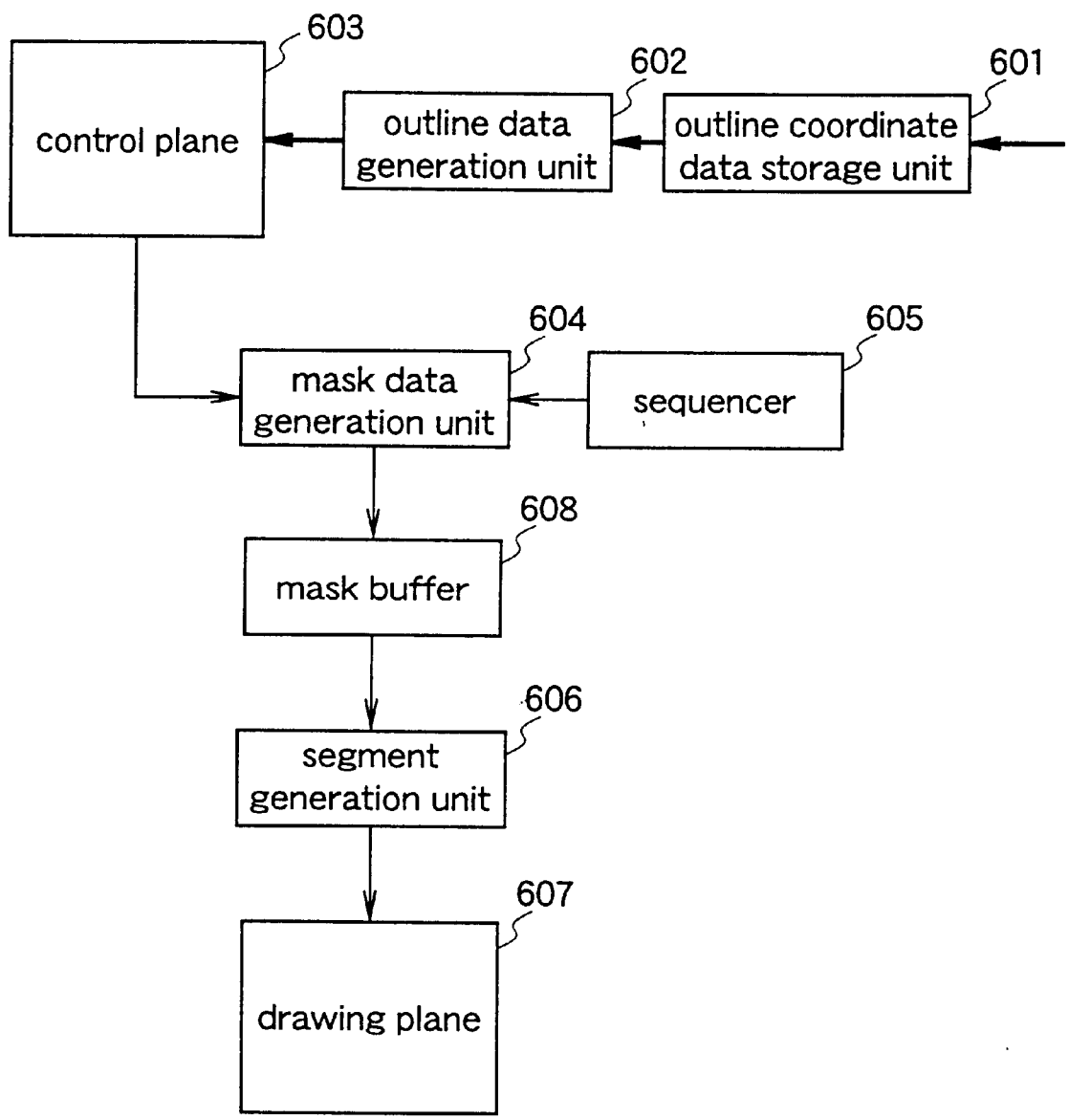
FIG. 6 is a block diagram illustrating the structure of a polygon drawing apparatus according to a second embodiment of the present invention.

FIG. 6 is a block diagram illustrating the construction of the polygon drawing apparatus according to the second embodiment. As shown in FIG. 6, the polygon drawing apparatus comprises an outline coordinate data storage unit 601, an outline data generation unit 602, a control plane 603, a mask data generation unit 604, a sequencer 605, a segment generation unit 606, a drawing plane 607, and a mask buffer 608.

The mask data generation unit 604 generates mask data in like manner as described for the mask data generation unit 104 of the first embodiment (refer to FIG. 1). However, the mask data generation unit 604 is different from the mask data generation unit 104 in that it performs "skipping" as described later during generation of the mask data, and stores the generated mask data in the mask buffer 608. The mask buffer 608 temporarily stores the mask data. The segment generation unit 606 writes the data which has been subjected to coloring, in the drawing plane 607, according to the mask data, like the segment generation unit 106 of the first embodiment (refer to FIG. 1). However, the segment generation unit 606 receives the mask data not from the mask data generation unit 604 but from the mask buffer 608. The outline coordinate data storage unit 601, the outline data generation unit 602, the control plane 603, the sequencer 605, and the drawing plane 607 are identical to those units 101, 102, 103, 105, and 107 of the polygon drawing apparatus of the first embodiment, respectively.

Figure 14:
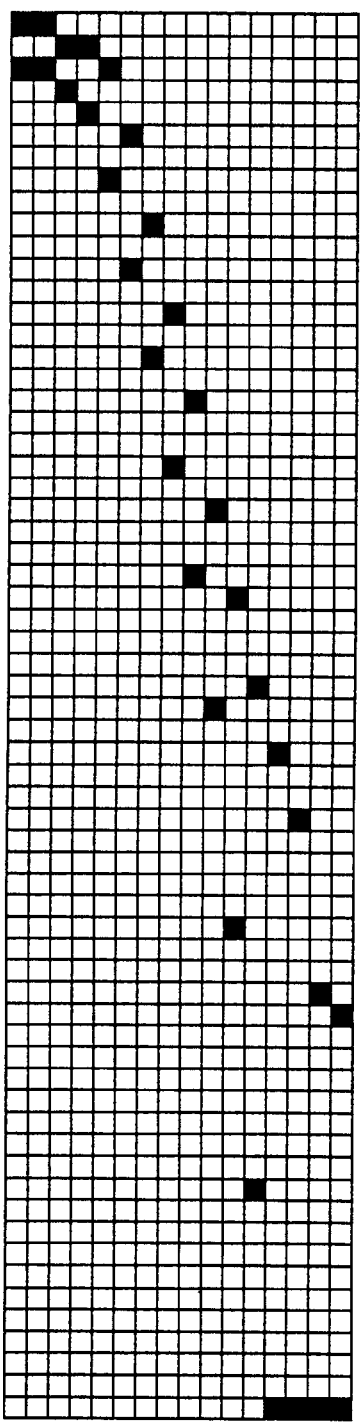
FIGS. 14(a) and 14(b) are diagrams illustrating the storage state of outline data used for map information or the like, in the polygon drawing method according to the prior art.
Figure 14:
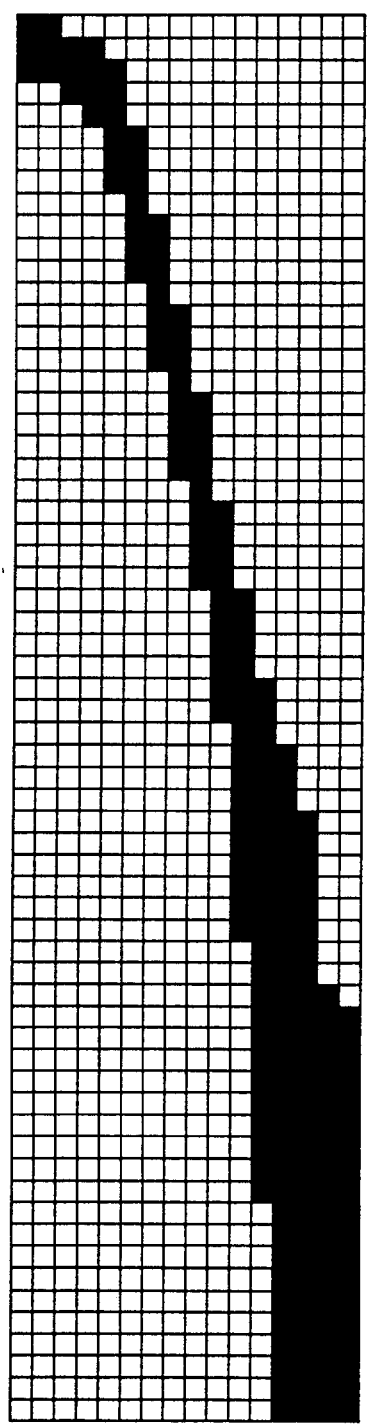

A description will be given of the operation of the polygon drawing apparatus so constructed. Initially, outline coordinate data indicating the coordinates of plural points is input to the polygon drawing apparatus and stored in the outline coordinate data storage unit 601. The outline data generation unit 602 generates outline data indicating the outline of a polygon to be displayed, according to the outline coordinate data, and stores this in the control plane 603. FIG. 7(a) shows the state of the outline data stored in the control plane 603, and this outline data corresponds to a polygon shown in FIG. 7(b). That is, FIG. 7(b) shows the result of display to be obtained from the outline data of FIG. 7(a). In this second embodiment, FIG. 7(b) shows a graphic (polygon) indicating a river which is used in map information of a car navigation system, like the graphic shown in FIG. 14(b). As shown in FIG. 7(b), broad regions to be unpainted exist outside the polygon.

Like the mask data generation unit 104 of the first embodiment (refer to FIG. 1), the mask data generation unit 604 of this second embodiment reads and processes the outline data stored in the control plane 603, 8 bits by 8 bits, starting from the top of the horizontal lines constituting the outline data, in the scanning direction shown in FIG. 7(a). Since each of the horizontal lines constituting the outline data shown in FIG. 7(a) corresponds to 64 bits (8×8 bits), the mask data generation unit 604 reads one horizontal line divided into 8 parts, each by 8 bits.

Accordingly, the uppermost horizontal line 701 shown in FIG. 7(a) is processed in eight processing units, G1–G8. Amongst these processing units, G1–G7 are the units in which all of the 8 bits are "0" indicating "no painting", and only the processing unit G8 is the unit which includes two bits of "1" indicating "painting". In the 8-bits by 8-bits processing, when all of the 8 bits constituting one processing object (processing unit) are "0", the mask data generation unit 604 skips this object without generating mask data. Accordingly, in the horizontal line 701, the processing units G1–G7 are skipped, and only the processing unit G8 is subjected to the mask data generating process as described for the first embodiment. The mask data generation unit 604 outputs the generated mask data to the mask buffer 608, and the mask buffer 608 holds the mask data. In this way, according to this second embodiment, only the 8 bits of the processing unit G8 are the substantial processing object, amongst the 64 bits of the processing units G1–G8 constituting the outline data line 701.

Likewise, when scanning a horizontal line 702 shown in FIG. 7(a), the processing units G1, G6, G7, and G8 comprising bits of "0" indicating "no painting" are not regarded as the processing objects while only 32 bits corresponding to the processing units G2, G3, G4, and G5 are regarded as the processing objects, and 24 bits amongst the 32 bits are subjected to "painting".

The mask data generation unit 604 stores the generated mask data in the mask buffer 608, and the segment generation unit 606 performs writing of data in the drawing plane 607 in accordance with the mask data taken from the mask buffer 608. Although the operation of the mask data generation unit 604 is identical to that described for the first embodiment, in this second embodiment the mask data from the mask data generation unit 604 is transmitted to the segment generation unit 606, not directly but through the mask buffer 608, whereby the process in the mask data generation unit 604 and the process in the segment generation unit 606 are performed according to parallel pipeline processing. Therefore, even when a difference in processing speed is generated between the processes up to the mask data generation unit 604 and the processes on and after the segment generation unit 606, the mask buffer can absorb this difference, resulting in high-speed and reliable processing.

As described above, the polygon drawing apparatus of this second embodiment is provided with the outline coordinate data storage unit 601, the outline data generation unit 602, the control plane 603, the mask data generation unit 604, the sequencer 605, the segment generation unit 606, the drawing plane 607, and the mask buffer 608, and the mask data generation unit 604 limits the processing object, and the mask data generated in the mask data generation unit 604 is transmitted through the mask buffer 608 to the segment generation unit 606. Therefore, when processing polygonal graphics such as landforms and objects in map information, efficient processing by a predetermined amount of data at a time is realized and, further, the processing speed is increased by the pipeline operation.

Embodiment 3

According to a third embodiment of the present invention, a polygon drawing apparatus performing the same processing as that described for the second embodiment is implemented as a semiconductor integrated circuit device, and this device repeatedly uses a control plane which is implemented by a high-speed storage medium.

Figure 8:
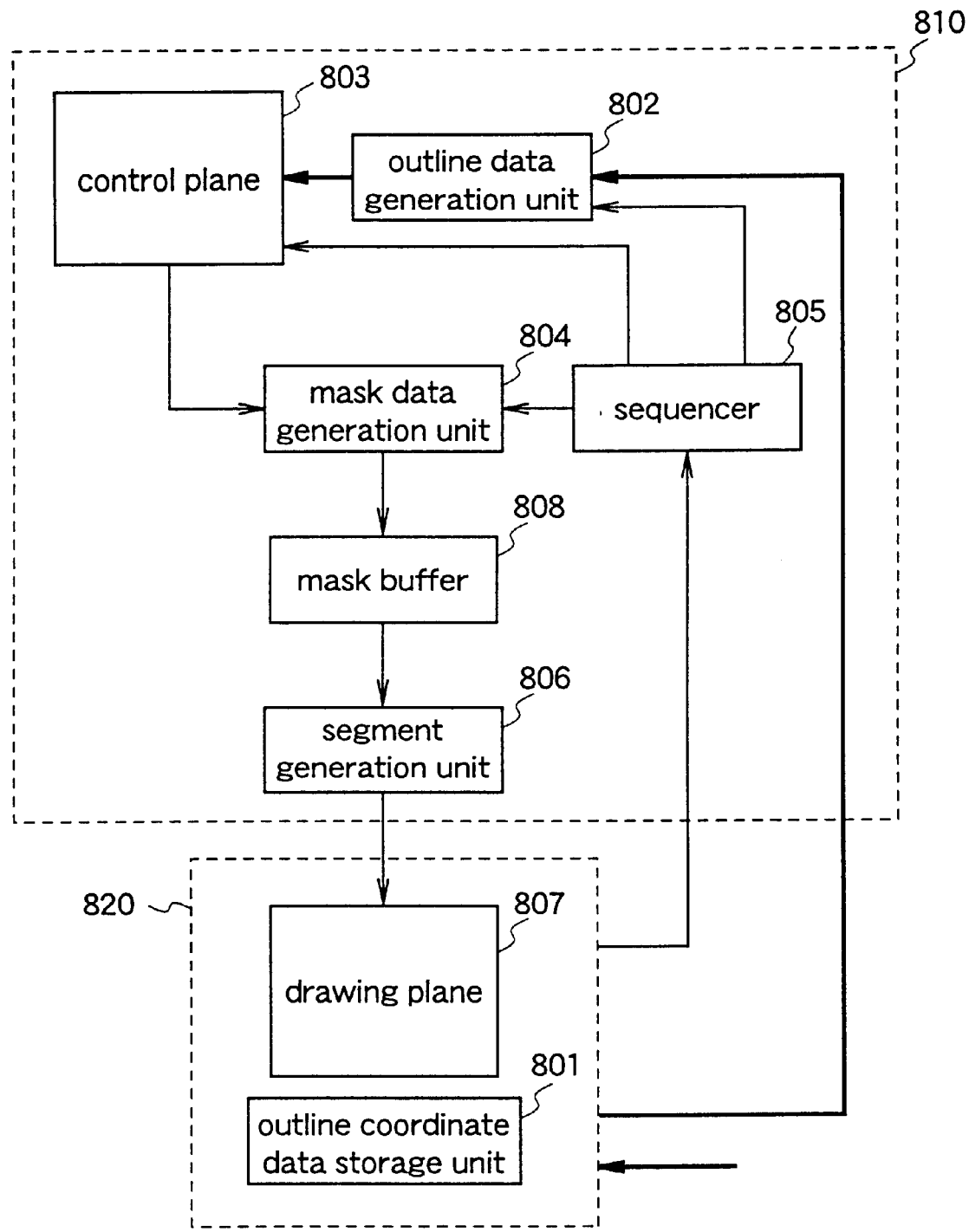
FIG. 8 is a block diagram illustrating the structure of a polygon drawing apparatus according to a third embodiment of the present invention.

FIG. 8 is a block diagram illustrating the construction of the polygon drawing apparatus according to this third embodiment. As shown in the figure, the polygon drawing apparatus comprises an outline coordinate data storage unit 801, an outline data generation unit 802, a control plane 803, a mask data generation unit 804, a sequencer 805, a segment generation unit 806, a drawing plane 807, and a mask buffer 808.

The outline coordinate data storage unit 801, the outline data generation unit 802, the control plane 803, the mask data generation unit 804, the sequencer 805, the segment generation unit 806, the drawing plane 807, and the mask buffer 808 operate in like manner as the units 601–608 of the second embodiment. In this third embodiment, as shown in FIG. 8, the outline data generation unit 802, the control plane 803, the mask data generation unit 804, the sequencer 805, the segment generation unit 806, and the mask buffer 808 are integrated on a single substrate to provide a drawing processor chip 810, and the drawing plane 807 and the outline coordinate data storage unit 801 are mounted on an external storage (external memory) 820. As the control plane 803, an internal storage (internal memory) of the drawing processor chip 810 is employed, and the processing speed of this memory is a higher than that of the external memory 820.

Hereinafter, a description will be given of the operation of the polygon drawing apparatus so constructed when it processes a graphic shown in FIGS. 7(a) and 7(b).

Initially, outline coordinate data supplied from an external CPU or the like is input to the polygon drawing apparatus, and stored in the outline coordinate data storage unit 801. Next, the outline data generation unit 802 generates outline data in accordance with the outline coordinate data stored in the outline coordinate data storage unit 801, and stores the data in the control plane 803 under control of the sequencer 805 described as follows.

While in the second embodiment it is premised that the control plane 603 has a sufficient capacity and the outline data is stored as shown in FIG. 7(a), in this third embodiment a high-speed internal memory of the drawing processor chip 810 is used as the control plane 803 and, therefore, a bulk memory cannot be used as the control plane 803. In this third embodiment, it is premised that the capacity of the control plane 803 is 256 bits.

In this third embodiment, when storage of the outline coordinate data indicating the outline of a polygon to be processed has been completed, the sequencer 805 decides whether or not the outline data of this polygon can be stored in the control plane 803. Since 1024 bits (horizontal 64 bits×vertical 16 bits) are required to realize the storage state shown in FIG. 7(a), the sequencer 805 decides that the outline data of the polygon cannot be stored in the control plane 803, and controls the control plane 803 so that it has a width of 64 bits. When processing horizontal 64 bits× vertical 4 bits at a time as shown in FIGS. 9(a)–9(d), each data size is 256 bits, and this data can be stored in the control plane 803. Accordingly, in this third embodiment, the outline data is divided into four parts (refer to ①–④ shown in FIGS. 9(a)–9(d)) to be processed.

Under control of the sequencer 805, the outline data generation unit 802 reads a predetermined amount of outline coordinate data (in this case, 1/4) from the outline coordinate data storage unit 801, and generates outline data to be stored in the control plane 803. Accordingly, the state of the outline data stored in the control plane 803 is as shown in FIG. 9(*a*).

After storage of the outline data, the mask data generation unit 804 generates mask data in the same manner as described for the second embodiment, and stores it in the mask buffer 808. The segment generation unit 806 performs writing of data in the drawing plane 807 in accordance with the mask data stored in the mask buffer 808 in the same manner as described for the second embodiment. In the drawing plane 807, writing as shown in FIG. 9(*e*) is performed.

Figure 9:
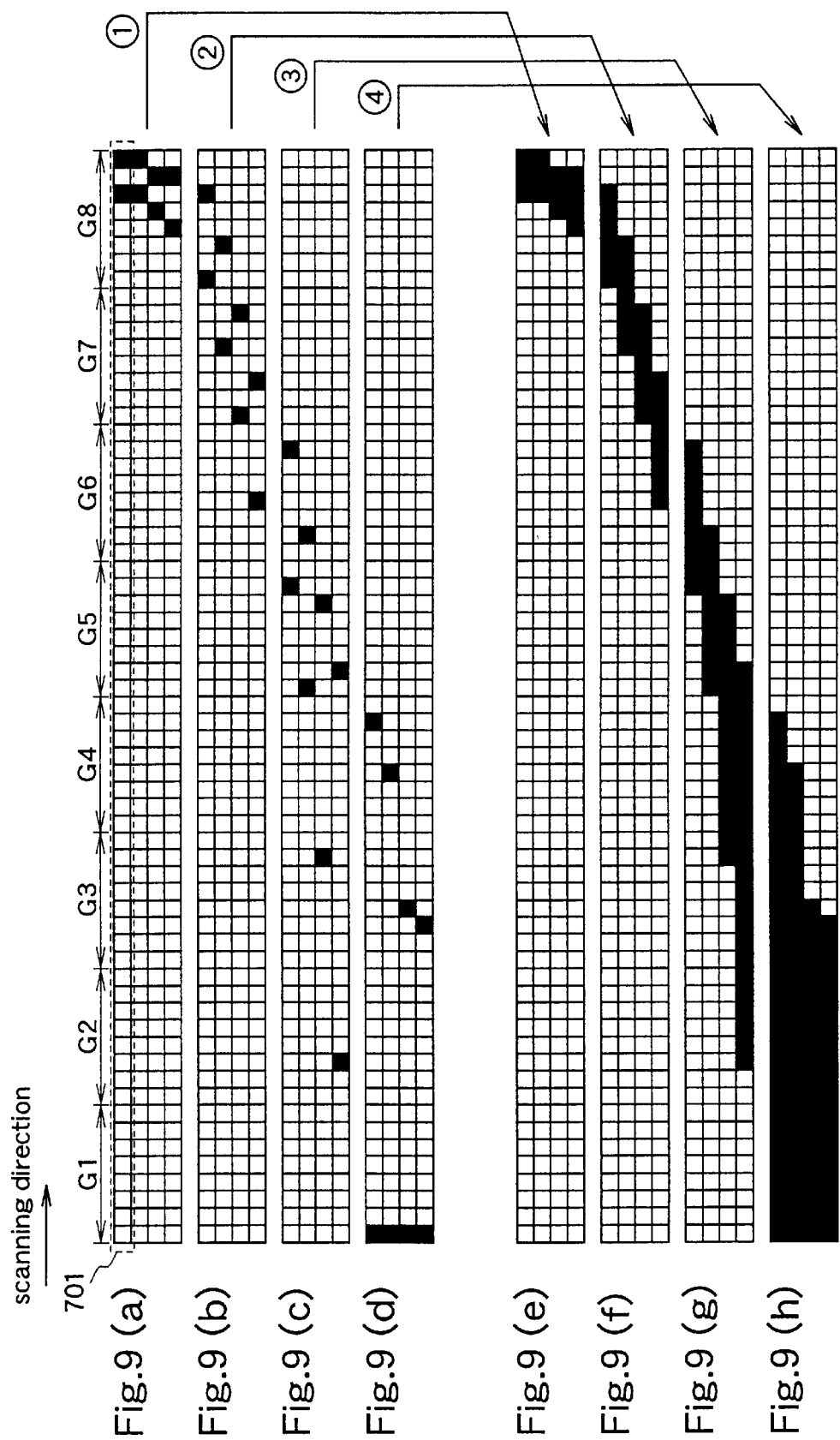
FIGS. 9(a)–9(h) are diagrams for explaining the storage state of outline data according to the third embodiment, and the process using the outline data.
Figure 10:
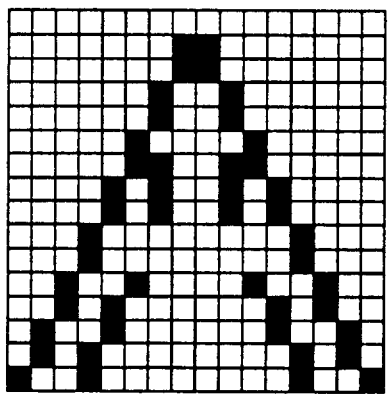
FIGS. 10(a)–10(d) are diagrams for explaining data indicating the outline of a polygon.
Figure 10:
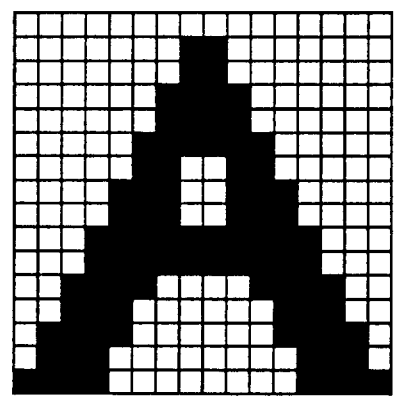
Figure 10:
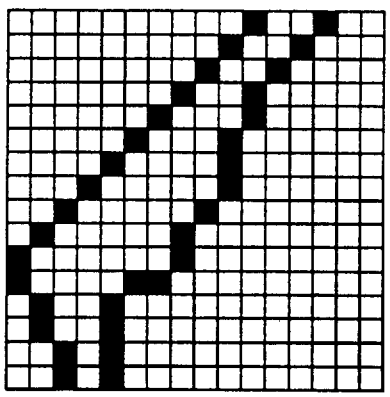
Figure 10:
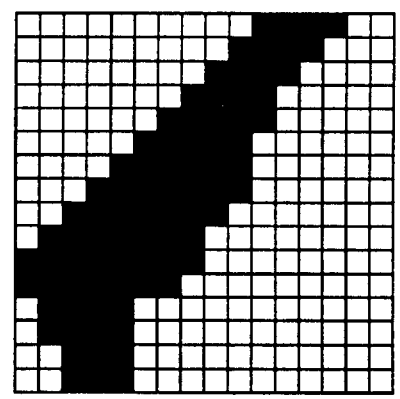
Figure 11:
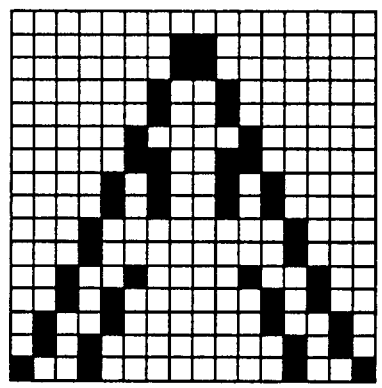
FIGS. 11(a)–11(d) are diagrams for explaining the storage state of outline data and the process using the outline data, in a polygon drawing method according to the prior art.
Figure 11:
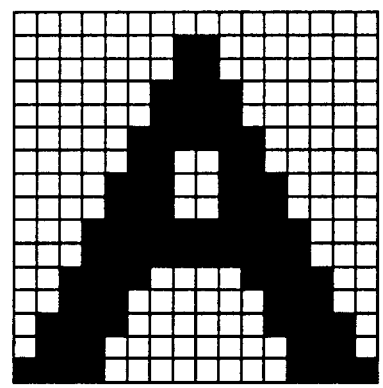
Figure 11:
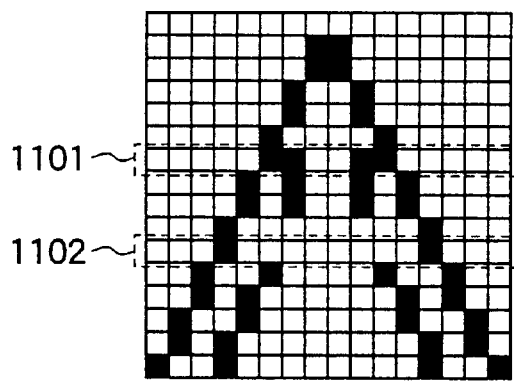
Figure 11:
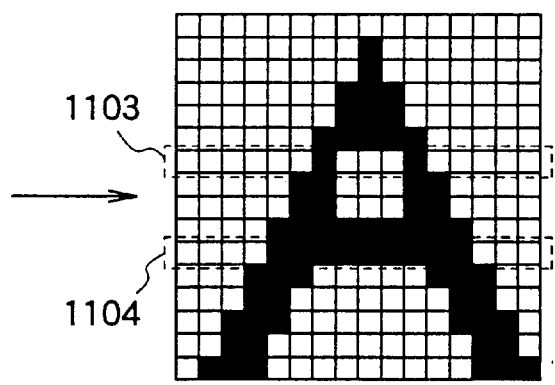
Figure 12:
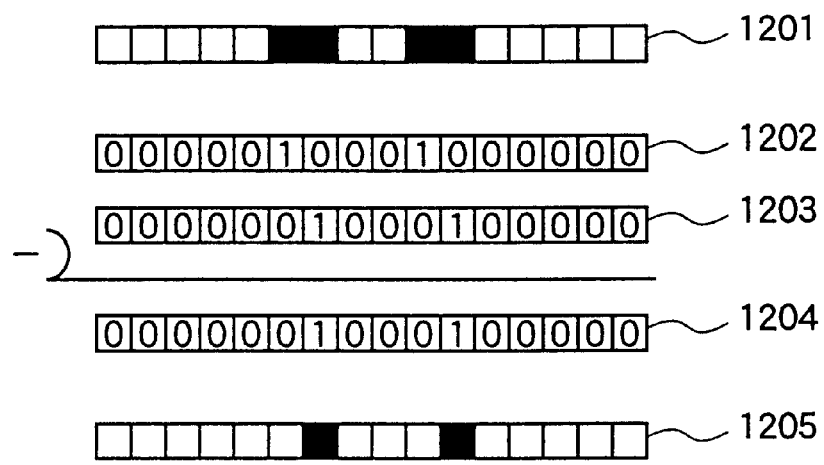
FIGS. 12(a) and 12(b) are diagrams for explaining generation of data indicating "painting", by using outline data, in the polygon drawing method according to the prior art.
Figure 12:
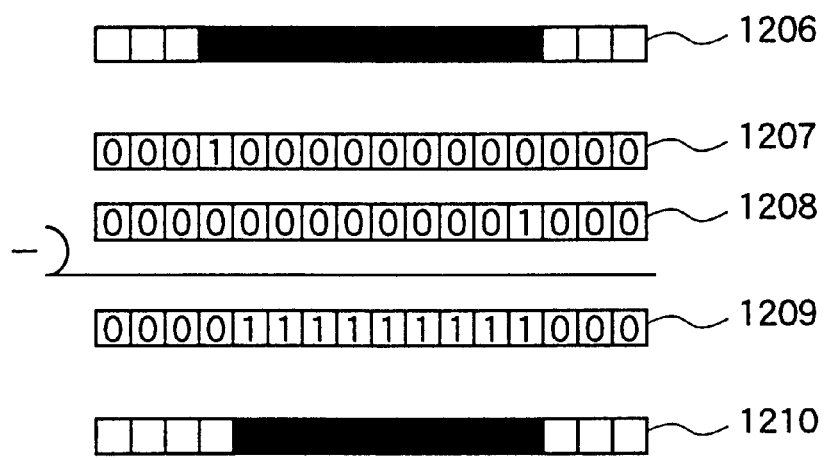

Next, the outline data shown in FIG. 9(*b*) is obtained from the subsequent 1/4 outline coordinate data, followed by the same process as mentioned above. When the processing steps from generation of outline data to writing in the drawing plane have been repeated four times, the processing for the object polygon is completed.

As described above, the polygon drawing apparatus according to the third embodiment is provided with the data coordinate data storage unit 801, the outline data generation unit 802, the control plane 803, the mask data generation unit 804, the sequencer 805, the segment generation unit 806, the drawing plane 807, and the mask buffer 808. The outline data generation unit 802, the control plane 803, the mask data generation unit 804, the sequencer 805, the segment generation unit 806, and the mask buffer 808 are integrated on a semiconductor substrate to provide a drawing processor chip 810 comprising these units. Therefore, a high-speed internal memory can be used as the control plane 803 to increase the processing speed. Further, since the sequencer 805 controls generation of outline data by the outline data generation unit 802 and storage of data in the control plane 803 in accordance with the outline coordinate data stored in the outline coordinate data storage unit 801, even when the processing objects are polygons having different sizes and shapes in map information or the like, appropriate processing can be executed by using a capacity-limited high-speed internal memory as the control plane 803.

While in this third embodiment processing adapted to an object to be drawn is performed under control of the sequencer 805, when an object to be drawn is predetermined according to the use of the polygon drawing apparatus and so the construction of the drawing plane 807 can be fixed, the sequencer 805 does not perform such control but performs like the sequencer 605 according to the second embodiment. Also in this case, high-speed processing by integrating the units as one chip can be achieved as well.

What is claimed is:

1. A polygon drawing method for drawing a polygon which is colored inside its outline by using outline data indicating the outline of the polygon, said method comprising:

dividing plural lines which constitute the outline data indicating the outline of the polygon into a predetermined amount for each of the plural lines and performing, for the predetermined amount of the outline data, parallel exclusive-OR processes in units of amounts constituting the predetermined amount, thereby generating mask data which specifies "coloring" for the inside of the outline; and drawing the polygon by using the generated mask data.

2. The polygon drawing method of claim 1, wherein generating mask data includes, besides the exclusive-OR processes, OR processes to obtain the OR of the predetermined amount of the outline data and each of the results of the parallel exclusive-OR processes performed on the predetermined amount of the outline data.

3. A polygon drawing method for drawing a polygon which is colored inside its outline by using outline data indicating the outline of the polygon, said method comprising:

generating mask data specifying "coloring" for the inside of the outline by using a predetermined amount of the outline data, and generating status data indicating whether or not the mask data generating status should be continued exceeding the predetermined amount of the outline data;

drawing the polygon by using the generated mask data; and performing subsequent generation of mask data and status data by using the status data obtained in the previous generation of mask data and status data, as well as the predetermined amount of the outline data.

4. The polygon drawing method of claim 3, wherein the mask data is obtained by correcting mask data which has been generated by using the predetermined amount of the outline data indicating the outline in accordance with the predetermined amount of the outline data.

5. A polygon drawing apparatus for drawing a polygon which is colored inside its outline by using outline data indicating the outline of the polygon, said apparatus comprising:

an outline data generation means for generating outline data indicating the outline of the polygon on the basis of coordinate data indicating coordinates of points constituting the polygon;

a mask data generation means for dividing plural line which constitute the outline data indicating the outline of the polygon into a predetermined amount for each of the plural lines and performing, for the predetermined amount of the outline data, parallel exclusive-OR processes in units of amounts constituting the predetermined amount, thereby generating mask data which specifies "coloring" for the inside of the outline; and a segment generation means for drawing the polygon by using the mask data generated by said mask data generation means.

6. The polygon drawing apparatus of claim 5, wherein said mask data generation means performs, besides the exclusive OR processes, OR processes to obtain the OR of the predetermined amount of the outline data and each of the results of the parallel exclusive-OR processes performed on the predetermined amount of the outline data.

7. A polygon drawing apparatus for drawing a polygon which is colored inside its outline by using outline data indicating the outline of the polygon, said apparatus comprising:

an outline data generation means for generating outline data indicating the outline of the polygon on the basis of coordinate data indicating coordinates of points constituting the polygon;

a mask data generation means for generating mask data specifying "coloring" by using a predetermined amount of the outline data indicating the outline, and generating status data indicating whether or not the mask data generating status should be continued exceeding the predetermined amount of the outline data and, when the status data indicates "continuation", continuing the mask data generation and the status data generation by using the predetermined amount of outline data generating in the next stage by said outline data generating means, and the status data indicating the previous processing status;

a segment drawing means for drawing the polygon by using the mask data generated by said mask data generation means.

8. The polygon drawing apparatus of claim 7, wherein the mask data is obtained by correcting mask data which has been generated by said mask data generation means using the predetermined amount of the outline data indicating the outline in accordance with the predetermined amount of the outline data.

9. The polygon drawing apparatus of claim 5, further comprising:

a storage means for temporarily storing the mask data generated by said mask data generation means; and said segment generation means performing drawing by using the mask data temporarily stored by said storage means.

10. The polygon drawing apparatus of claim 7, further comprising:

a storage means for temporarily storing the mask data generated by said mask data generation means; and said segment generation means performing drawing by using the mask data temporarily stored by said storage means.

11. A polygon drawing apparatus for drawing a polygon which is colored inside of its outline by using outline data indicating the outline of the polygon, said apparatus comprising:

an outline data generation unit operable to generate outline data indicating the outline of the polygon on the basis of coordinate data indicating coordinates of points constituting the polygon;

a mask data generation unit operable to divide plural lines which constitute the outline data indicating the outline of the polygon into a predetermined amount for each of the plural lines and perform, for the predetermined amount of the outline data, parallel exclusive-OR processes in units of amounts constituting the predetermined amount to generate mask data which specifies a coloring for the inside of the outline of the polygon; and a segment generation unit operable to draw the polygon by using the mask data generated by said mask data generation unit.

12. The polygon drawing apparatus of claim 11, wherein said mask data generation unit is further operable to perform OR processes to obtain the OR of the predetermined amount of the outline data and each of the results of the parallel exclusive-OR processes performed on the predetermined amount of the outline data.

13. The polygon drawing apparatus of claim 11, further comprising:

a storage unit operable to temporarily store the mask data generated by said mask data generation unit;

wherein said segment generation unit is operable to preform the drawing by using the mask data temporarily stored by said storage unit.

14. A polygon drawing apparatus for drawing a polygon which is colored inside of its outline by using outline data indicating the outline of the polygon, said apparatus comprising:

an outline data generation unit operable to generate outline data indicating the outline of the polygon on the basis of coordinate data indicating coordinates of points constituting the polygon;

a mask data generation unit operable to generate mask data specifying coloring by using a predetermined amount of the outline data indicating the outline, and operable to generate status data indicating whether or not the mask data generating status data indicating whether or not the mask data generating status should be continued exceeding the predetermined amount of the outline data and, when the status data indicates continuation, continuing the mask data generation and the status data generation by using the predetermined amount of the outline data generated in the next stage by said outline data generation unit, and the status data indicating the previous processing status; and a segment drawing unit operable to draw the polygon by using the mask data generated by said mask data generation unit.

15. The polygon drawing apparatus of claim 14, wherein the mask data is obtained by correcting mask data which has been generated by said mask data generation unit using the predetermined amount of the outline data indicating the outline in accordance with the predetermined amount of the outline data.

16. The polygon drawing apparatus of claim 14, further comprising:

a storage unit operable to temporarily store the mask data generated by said mask data generation unit;

wherein said segment generation unit is operable to preform the drawing by using the mask data temporarily storage by said storage unit.

17. The polygon drawing apparatus of claim 5, further comprising:

an outline coordinate data storage means for storing the coordinate data indicating the coordinates of points constituting the polygon.

18. The polygon drawing apparatus of claim 7, further comprising:

an outline coordinate data storage means for storing the coordinate data indicating the coordinates of points constituting the polygon.

19. The polygon drawing apparatus of claim 11, further comprising:

an outline coordinate data storage unit operable to store the coordinate data indicating the coordinates of points constituting the polygon.

20. The polygon drawing apparatus of claim 14, further comprising:

an outline coordinate data storing unit operable to store the coordinate data indicating the coordinates of points constituting the polygon.

* * * * *